(12) United States Patent
Shumilin et al.

(10) Patent No.: US 9,316,518 B2
(45) Date of Patent: Apr. 19, 2016

(54) METHOD FOR MEASURING THE FLOW RATE OF A MULTI-PHASE LIQUID

(71) Applicants: Sergey V. Shumilin, Ulyanovsk (RU); Vladimir N. Shumilin, Ulyanovsk (RU)

(72) Inventors: Sergey V. Shumilin, Ulyanovsk (RU); Vladimir N. Shumilin, Ulyanovsk (RU)

( * ) Notice: Subject to any disclaimer, the term of this patent is extended or adjusted under 35 U.S.C. 154(b) by 0 days.

(21) Appl. No.: 14/540,352

(22) Filed: Nov. 13, 2014

(65) Prior Publication Data

US 2015/0068321 A1 Mar. 12, 2015

Related U.S. Application Data

(63) Continuation of application No. PCT/RU2013/000185, filed on Mar. 12, 2013.

(51) Int. Cl.
*G01F 1/74* (2006.01)
*G01F 1/66* (2006.01)

(52) U.S. Cl.
CPC *G01F 1/74* (2013.01); *G01F 1/667* (2013.01); *G01F 1/668* (2013.01)

(58) Field of Classification Search
CPC ............... G01F 1/74; G01F 1/66; G01F 1/60
USPC .................. 73/861.4, 861.27, 861.28, 861.18
See application file for complete search history.

(56) References Cited

U.S. PATENT DOCUMENTS 5,415,048 A * 5/1995 Diatschenko ........... G01F 1/666
 73/861.04
7,299,705 B2 * 11/2007 Gysling ................ G01F 1/7082
 73/861.27
7,380,439 B2 * 6/2008 Gysling ..................... G01F 1/74
 73/32 A
7,401,530 B2 7/2008 Johansen
2007/0157737 A1 7/2007 Gysling

FOREIGN PATENT DOCUMENTS

RU 2140538 C1 10/1999
RU 2439502 C2 1/2012
RU 2489685 C2 8/2013

OTHER PUBLICATIONS

International Search Report from PCT/RU2013/000185, filed Mar. 12, 2013, mailed Dec. 12, 2013.
Ermolkin et al, The Oil and Gas Wells Operational Control System, "Modern Automation Technology," 2001, p. 44-49, No. 2.

(Continued)

*Primary Examiner* — Jewel V Thompson
(74) *Attorney, Agent, or Firm* — Patentbar International, P.C.

(57) ABSTRACT

The method for measuring the flow rate of a multi-phase liquid determines the speed of sound and the density of each phase, and determining the speed of sound in each of the phases of the liquid within a working temperature range. The amplitudes of the vibrations of the pipe along which the multi-phase liquid flows and the frequencies corresponding thereto are determined A range of frequencies with maximum amplitude values is selected. The measured range of frequencies is divided into three parts—the low frequencies corresponding to the gas phase, the mid-frequencies corresponding to the oil phase, the high frequencies corresponding to the water phase. In each of the parts of said frequencies the maximum values of the amplitude are isolated after the use of fast Fourier transforms. Then the volumetric flow rate of each phase of the liquid is calculated on the basis of a given formula.

1 Claim, 2 Drawing Sheets

(56) References Cited

OTHER PUBLICATIONS

DASYLab, Data Acquisition System Laboratory, S-Version, 32-bit version for Widows 98, Windows NT V4, Windows 2000, User Guide.

Kristalinsky R. E. et al, Fourier and Laplace's transformations in systems of computer mathematics: Manual for higher education institutions.—M.: Hot liniya-Telecom, 2006. p. 69-71, p. 73.

Panferov A.I. et al, Application of MathCAD in engineering calculations: Manual / St. Petersburg State University of Aerospace Instrumentation. SPb., 2004. p. 41-44.

\* cited by examiner

METHOD FOR MEASURING THE FLOW RATE OF A MULTI-PHASE LIQUID

RELATED APPLICATIONS

This Application is a Continuation Application of International Patent Application PCT/RU2013/000185, filed Mar. 12, 2013, which is incorporated herein by reference in its entirety.

FIELD OF THE INVENTION

The method of measuring the flow rate of multiphase liquids relates to the field of oil and gas exploration, and can be used for measuring of the gas, condensate and oil wells multiphase flows.

BACKGROUND OF THE INVENTION

In industry known the method of measuring of uneven motion of a fluid (RU 2140538, E21B47/10, G01F1/66 (JSC "Tatneft"), 27.10.1999). The object of the invention is to simplify the process control flow of the fluid flowing through the pipeline. The method comprises measuring the time the liquid passing through a pipe with known size, the speed of the transmission and subsequent processing the data. The new is—the time the liquid passing the pipe section with known size is determined by the presence of acoustic noise generated by the motion of the fluid, and the rate of passage of the liquid is determined by the frequency of occurrence of portions of the acoustic noise caused by non-uniformity of fluid motion.

The disadvantage of the known methods is the lack of analysis of acoustic signal data, such as frequency and amplitude. The acoustic signal is used only to determine the total fluid velocity without recognizing the individual phases, and determining the beginning and end of the fluid flow.

Also known the method for measuring the flow of multiphase fluids ("The oil and gas wells operational control system" the magazine "Modern automation technology>> No. 2, 2001, p. 44-49), in which the flow rate is measured by the amplitude of the spectral power changes in pressure in the pipeline after setting in line narrowing device of the special form (whistle), effective to measure the flow with high GOR.

The disadvantage of the method is—the method applicable for gas wells with low liquid phase in the flow only.

In the oil-water emulsions with a low gas-oil ratio the method is not applicable because the liquid block the orifice. In other words, "whistle" in the fluid will not generate the signal. The method does not require to measure the physical properties of the liquid phase, for example sound speed. In case of presence of the sand in the flow the orifice nozzle deteriorates and it leads to the inaccurate flow measurement.

The method for measuring multiphase fluid flow (U.S. Pat. No. 7,401,530 B2 on Jul. 22, 2008 "SONAR BASED MULTIPHASE FLOWMETER") was chosen as the prototype. In this method measures the speed of sound in the individual phases of the multiphase fluid moving in the pipe, measure the speed of wave spreading along the pipe, measure the volume of one phase of the flow, measured average velocity of the multiphase fluid in the pipe, measured density of each phase, and then, based on the proposed algorithm is calculated volume or mass flow of each phase. In this case, the speed of sound is used only as a mark to recognize the particular phase in the pipe, assuming that the velocity changes because of the flow phases ration is known in advance. The disadvantages of the prototype are:

1. Use equipment to measure the only one phase in a multiphase flow, for example, water, leads to additional errors in flow measurement. The errors occur because the phase ratio at the multi-phase flow varied significantly.

2. The presents of the hydrophilic and hydrophobic phases in the flow leads to deposits on the pipe walls. The deposits adversely affecting the measurement process of one of the phases. This applies to all type sensors—magnetic, electric, radiant, ionizing (see. p. 6-9 of the patent).

3. The mathematical correlation between the flow velocities, the particular phase velocity and densities of the phases is not given in the description.

4. Use two separate flowmeter to measure the multiphase flow and water flow as proposed in the method is not required. All essential information can be obtained from the acoustic sensor installed at the pipe.

SUMMARY OF THE INVENTION

The present invention is proposed to eliminate above mentioned shortcomings.

Technical result: decrease the measurement error of each phase.

Technical result is achieved due to the fact that in the proposed method of measuring the flow of a multiphase fluid the following differences: determine the sound velocity and density of each phase, determine the speed of sound in each phases in the operating temperature range, measure and record the amplitude of the pipe oscillation at the pipe through which flows multiphase liquid and the amplitude corresponding frequencies. Select frequency range with the maximum amplitudes. The measured frequency range is divided into three parts, the lower frequencies correspond to the gas phase, medium—oil and high—water. After application of fast Fourier transforms [1,2,3], to each parts identifies the maximum amplitudes, and calculate the volumetric flow rate of each phase:

$$Q = \frac{\pi \cdot R^4 \cdot F^3 \cdot A \cdot K}{4 \cdot C^2},$$

Where:

Q—volumetric flow rate of a separate phase of the multiphase fluid in m3/s;

R—the radius of the pipe, m;

F—the maximum frequency of vibration in the selected range for a single phase, 1/s;

A—the maximum amplitude of oscillation at a frequency F, m;

K—dimensionless coefficient of proportionality, taking into account the special features of the multiphase fluid through the conduit during calibration vibro-acoustic sensor on the pipe;

C—the measured velocity of sound in the multiphase fluid phase determined experimentally for oil and gas and water tabular.

Example: Determine the accuracy of flow measurement for a frequency change of 1 Hz, assuming that such a change is recognized accurately for the three components of the flow:

Radius of the tube, m:
R=0.0254

The initial frequency for gas, oil and water respectively, Hz:
Fg=250
Foil=1000
Fw=1500

The sound velocity for gas, oil and water respectively, m/s:
Cgas=400
Coil=1200
Cw=1500
Assume the oscillation amplitude equal for all components, m:
A=0.00001
For example the frequency range can be from 251 to 7500 Hz:
F2=251 . . 7500
The equation for the components of the flow rate are:

$$\text{For phase 1: } Qw(F2) = \frac{\pi \cdot R^4 \cdot F2^3 \cdot A}{4 \cdot Cw^2}$$

$$\text{For phase 2: } Qoil(F2) = \frac{\pi \cdot R^4 \cdot F2^3 \cdot A}{4 \cdot Coil^2}$$

$$\text{For phase 3: } Qgas(F2) = \frac{\pi \cdot R^4 \cdot F2^3 \cdot A}{4 \cdot Cgas^2}$$

With the frequency change for 1 Hz the oil flow variation will be:

$$\Delta Qoil = Q2(F2) - Q1(F2)$$

DETAILED DESCRIPTION OF THE PREFERRED EMBODIMENTS

The technical result is obtained by the following method.
A computer with the software of DASYLab-11 (see User Manual Data Acquisition, Controlling, and Monitoring "Data Acquisition System Laboratory") is connected to a piezoelectric microphone which in turn is attached to the pipeline. In the program the signal is amplified, split into three parts by filters, the frequency of measuring a signal is set according to Nyquist, each portion passes through its spectrum analyzer, the allocated signals are checked for maximum amplitude and move to the block of mathematical transformations where values of speeds of a sound and coefficient of proportionality are also entered. At the exit either numerical values in the Excel tables or graphic materials in the form of the digital screen or the two-dimensional schedule are received.

Figure 1:
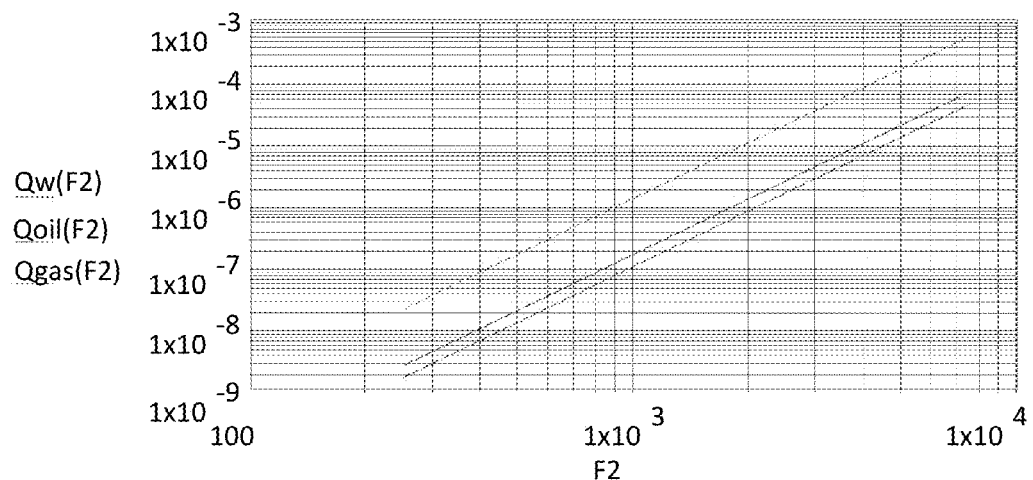
FIG. 1—The flow rate and acoustic signal frequency correlation.
Figure 2:
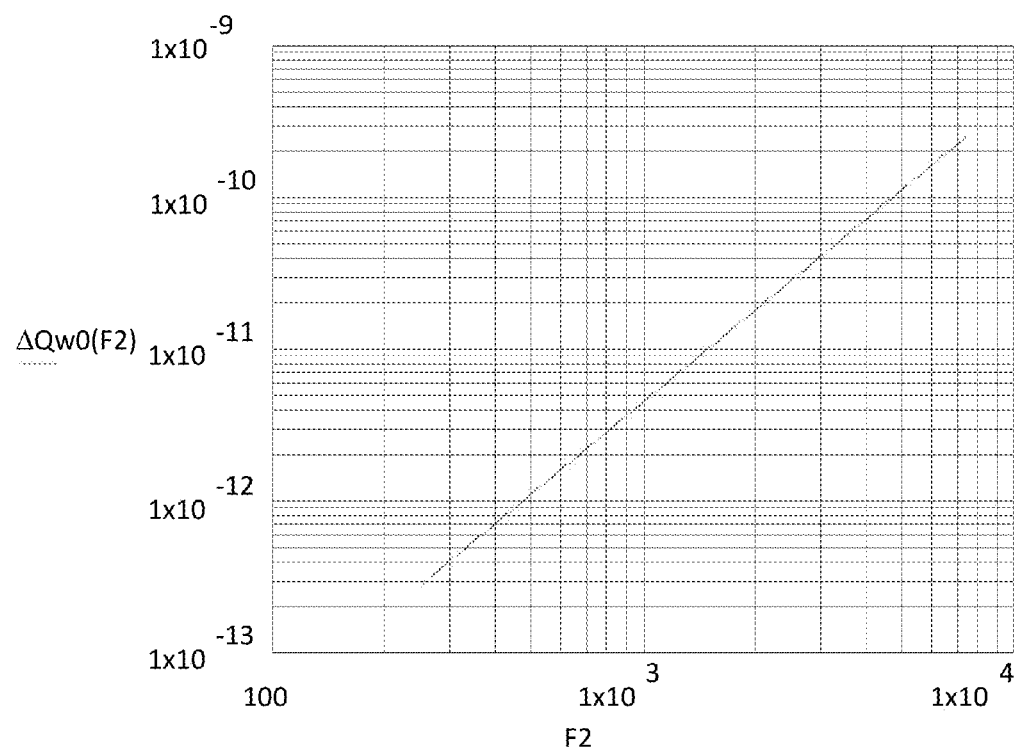
FIG. 2—Change the flow with the acoustic signal frequency change in 1 Hz.
Figure 3:
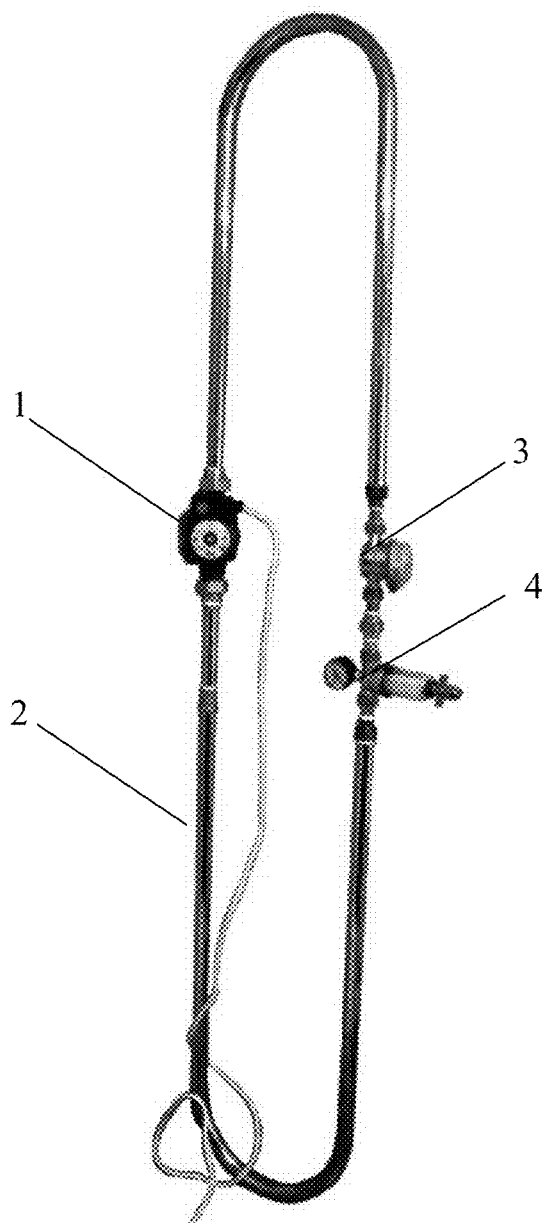
FIG. 3—The testing Stand

Pilot study: indications of devices (an flow rate, pressure, frequency of rotation of the pump), and also the frequency and amplitude of fluctuations of the pipeline were written down, using a flow loop which was specially made of a pipe with a diameter of 2 inches (FIG. 3), consisting of the pump 1, the pipeline 2, a flowmeter 3, the manometer 4 (other devices aren't shown). Processing of results was carried out in the DASYLab-11 and MathCAD-14 program.

Tap water, vegetable oil and air were used as multiphase liquid. Emulsions from 25%, 50%, and 75% mixture of oil with water were used. The volume of air was regulated by the change of volume of liquid in the flow loop. The piezoelectric microphone was established rigidly on a pipe. Measurements were carried out at the fixed values of temperature +20, +50, +80 degrees C. and the fixed values of numbers of rotation of the pump—100, 350, 700 turns/min.

Conditions of carrying out experiment:
Test liquid—tap water
Liquid temperature: 20 degrees C.
Pressure: 0.1 MPa
Frequency: it is specified in table 1
speed of sound in water: 1500 m/s
Amplitude of fluctuations: $1.03 \cdot 10^{-5}$ m When carrying out experiments it is established that the reached accuracy of measurement of each phase varies from $1 \cdot 10^{-9}$ to $1 \cdot 10^{-6}$ depending on the frequency, amplitude and other parameters. For all that the change of an error of measurement of each phase varies from $1 \cdot 10^{-9}$ to $1 \cdot 10^{-*}$ depending on the frequency, amplitude and other parameters.

TABLE I

| Results of pilot studies | |
|---|---|
| Frequency, Hz | Expense, m3/s |
| 1340 | 3.601E−09 |
| 2457 | 2.241E−08 |
| 3572 | 6.847E−08 |

INDUSTRIAL APPLICABILITY

As noted above, the method for measuring a flow rate of multiphase liquid according to the present invention allows to reduce an error of measurement of each phase. Therefore, it can be used in oil and gas extraction area, in particular, for measuring a flow rate of multiphase flows of operational gas, gas-condensate and oil.

The list of the used sources:
1. Kristalinsky R. E., Kristalinsky V. R. Fourier and Laplace's transformations in systems of computer mathematics: Manual for higher education institutions.—M.: Hot liniya-Telecom, 2006.-216 pages.
2. Panferov A. I., Loparev A. V., Ponomarev V. K. Application of MathCAD in engineering calculations: Manual/St. Petersburg State University of Aerospace Instrumentation. SPb., 2004. 88 pages.
3. User Manual Data Acquisition, Controlling, and Monitoring "Data Acquisition System Laboratory".

What is claimed is:
1. A method for measuring a flow rate of a multiphase liquid, the method comprising:
  measuring a temperature and pressure of a flow of the multiphase liquid, and measuring a density of each phase of the multiphase liquid;
  determining a speed of sound in each phase of the multiphase liquid in a working range of temperatures;
  measuring and recording amplitudes and frequencies of fluctuations of a pipe in which the multiphase liquid flows;
  dividing a range of the frequencies into portions, each portion corresponding to each phase of the multiphase liquid;
  applying fast Fourier transformation to each portion and obtaining for each portion maximal amplitudes and corresponding frequencies;
  measuring acoustic noise generated by the movement of liquid at its course through a known cross-section;
  determining a speed of flow of the liquid by the frequency of the acoustic noise caused by unevenness of the movement of liquid; and and calculating a volume flow rate of each phase of the multiphase liquid according to a formula:

$$Q = \frac{\pi \cdot R^4 \cdot F^3 \cdot A \cdot K}{4 \cdot C^2}$$

wherein:
Q—is a volumetric flow rate of a phase of the multiphase fluid in m³/s;
R—is a radius of the pipe, m;
F—is a maximal frequency of vibration in a selected range for a phase, 1/s;
A—is a maximal amplitude of oscillation at a frequency F, m;
K—is a dimensionless coefficient of proportionality;
C—is a measured speed of sound in a phase of the multiphase liquid, which is experimentally determined for oil and gas, and which is tabular for water.

* * * * *